United States Patent
Juang

(10) Patent No.: US 6,803,867 B1
(45) Date of Patent: Oct. 12, 2004

(54) DC COMPENSATION CIRCUIT FOR DIRECT CONVERSION RECEIVER

(75) Inventor: Kai-Cheung Juang, Nantou (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/754,425

(22) Filed: Jan. 9, 2004

(30) Foreign Application Priority Data

Aug. 26, 2003 (TW) ........................................ 92123389 A

(51) Int. Cl.$^7$ ................................................ H03M 1/06
(52) U.S. Cl. ...................................... 341/118; 341/120
(58) Field of Search .................................. 341/118, 120

(56) References Cited

U.S. PATENT DOCUMENTS 6,317,064 B1 * 11/2001 Ferrer et al. ................. 341/118
6,642,868 B1 * 11/2003 Brown et al. ................ 341/120

* cited by examiner

*Primary Examiner*—Brian Young
*Assistant Examiner*—Joseph Lauture
(74) *Attorney, Agent, or Firm*—Thomas, Kayden, Horstemeyer & Risley

(57) ABSTRACT

A DC offset compensation circuit for direct conversion receiver. The circuit compensates the DC offset generated by a direct conversion receiver, the DC offset generated by an amplifier. The present invention uses a combination of capacitor and active devices to generate a low cutoff frequency high pass response to compensate the DC offset.

7 Claims, 11 Drawing Sheets

DC COMPENSATION CIRCUIT FOR DIRECT CONVERSION RECEIVER

BACKGROUND OF THE INVENTION

1. Field of the Invention

The present invention relates to a DC compensation circuit, and in particular to a circuit compensating DC offset from a direct conversion receiver.

2. Description of the Related Art

In wireless communication products, conventional receivers utilize superheterodyne technique, requiring not only costly discrete devices but also application of external signal conversion. Superheterodyne receivers convert RF signals from all channels into IF signals by means of an external signal filter, and apply the IF signals to a local OSC and an external Voltage Control Oscillator (VCO) for conversion to baseband signals, raising costs and limiting yield. Therefore, direct conversion techniques, with lower power consumption and better suitability for multimedia systems, are widely used in receivers, omitting the need for IF signals conversion.

FIG. 1 is a block diagram of a typical direct conversion receiver, comprising a wireless receiver device 11, a mixer 13, a local OSC 15, a preamplifier 12, and a post-amplifier 14. As shown in FIG. 1, amplifier 12 amplifies RF signals from device 11, and mixer 13 mixes the amplified RF signals with those from local OSC 15 to generate baseband signals (converting RF signal to baseband directly). The amplifier 14 then amplifies the base-band signals for output through the terminal (out) to a device (not shown). Ideally, the converted local OSC frequency equals that of received RF signals RF signals 21 received by device 11 can thus be converted into baseband signals 22, as shown in FIG. 2.

In practice, leakage signals generated by local OSC 15 feed into the input end (not shown) of mixer 13 by radiation or substrate coupling, with resulting IF DC offset. Due to the local OSC signals being stronger than received RF signals, the resulting IF DC offset signals are also much stronger than the received RF signals. During amplification, the IF DC offset causes the amplifier 14 to enter a saturated state, limiting function. As well, asymmetry caused by circuit layout and manufacture through high-gain amplifiers generates DC offset.

Conventional direct conversion receivers comprise a DC offset compensation circuit. As shown in FIG. 4, most DC offset compensation circuits 40 connect to post-amplifier 14 to generate DC compensation and prevent distortion of output signals.

In communication theory, DC offset compensation circuit 40 can be treated as a one-stage high pass equivalent circuit, as shown in FIG. 5, if cutoff frequency of the circuit is 5 Khz and RC response time is 200 $\mu$s, resistance R=1M , and the capacitor C=100 pF. A solution using additional DC feedback circuits is disclosed in U.S. Pat. No. 5,430,765, which is poorly integrated and unable to combine the DC circuit into a single chip. Another solution integrates a function generator and offset adjustment circuit, as disclosed in U.S. Pat. No. 6,006,079. Unfortunately, high integration in this method results in 2 more complicated circuit with longer hopping time, requiring more baseband resources to adjust DC offset, an unsuitable method for hopping systems, in addition to the high cost.

SUMMARY OF THE INVENTION

Accordingly, the present invention provides a DC offset compensation circuit for direct conversion receivers using capacitors and a plurality of active devices.

Another object of the invention is to provide a compensation circuit to compensate both static DC offset and dynamic offset in two steps. The present invention with short hopping time is suitable for frequency hopping systems such as Global System for Mobile communication (GSM).

The present invention provides a DC offset compensation circuit for use with direct conversion receivers with low terminating frequency and high-pass response generated by capacitors and active devices. The capacitors and active devices described can be integrated into a single chip.

BRIEF DESCRIPTION OF THE DRAWINGS

The present invention can be more fully understood by reading the subsequent detailed description and examples with references made to the accompanying drawings, wherein:

FIG. 7b shows the frequency response of the DC offset compensation circuit shown in FIG. 7a;

DETAILED DESCRIPTION OF THE INVENTION

Figure 5:
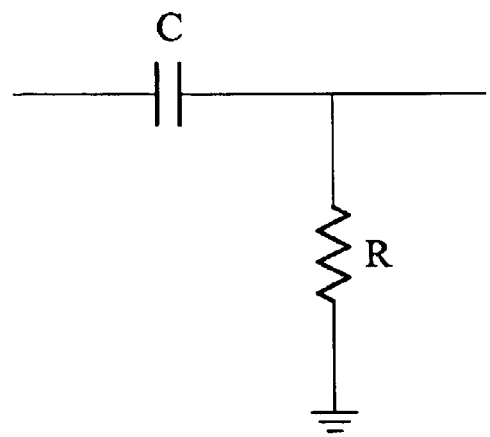
FIG. 5 is a diagram showing the equivalent circuit of a DC offset compensation circuit according to FIG. 4.
Figure 6:
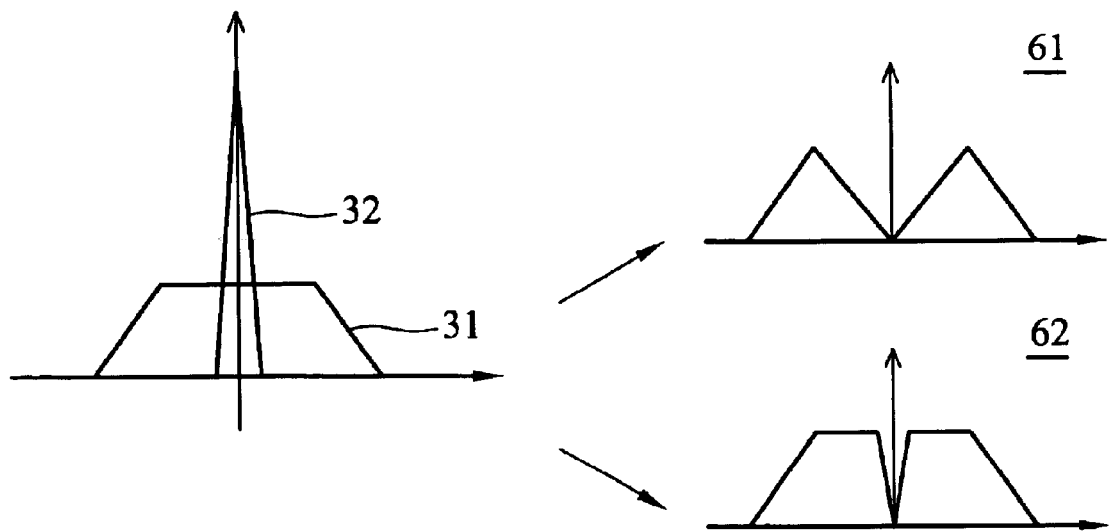
FIG. 6 shows the relationship between the cutoff frequency and the equivalent circuit.

The present invention provides a DC offset compensation circuit. FIG. 6 shows the relationship between an equivalent circuit of FIG. 5 and terminating frequency. The baseband spectrum through the direct conversion receiver is distributed symmetrically around the DC signal (not shown). With this cancellation of the DC signal, the signal is distorted. As shown on the left of FIG. 6, if the input signal 32 is lower than a cutoff frequency, the signal is decayed by the high pass DC compensation circuit (shown in FIG. 5), generating the output signal 31. The upper right area of FIG. 6 shows the received output signal 61 with a higher cutoff frequency. The lower right area of FIG. 6 shows the received output signal 62 with lower cutoff frequency. As shown in FIG. 6, the higher the cutoff frequency, the more DC is compensated from the baseband signal, distorting the signal severely. For example, comparing the output signals 61, 62, it is obvious that signal 62 is less distorted and more approximated to signal 31. In conclusion, lower cutoff frequency, better for ideal DC compensation, causes a longer period of stable time for the circuit. For example, 5 Khz cutoff frequency takes several micro seconds to stabilize, an unacceptable condition for any communication system, specifically rapid switching frequency hopping circuits. The invention provides 2 DC compensation circuit structures with low cutoff frequency to be applied in the direct conversion receiver shown in FIG. 4.

In FIG. 4 and FIG. 7a to FIGS. 7d, the first structure employs a parallel circuit as DC compensation circuit 40 comprising capacitor C7, switching circuit sw1, and amplifier 70. The output signal passes through the DC compensation circuit and is amplified by post-amplifier 14, before feeding back to post-amplifier 14 via adder 74.

Figure 7A:
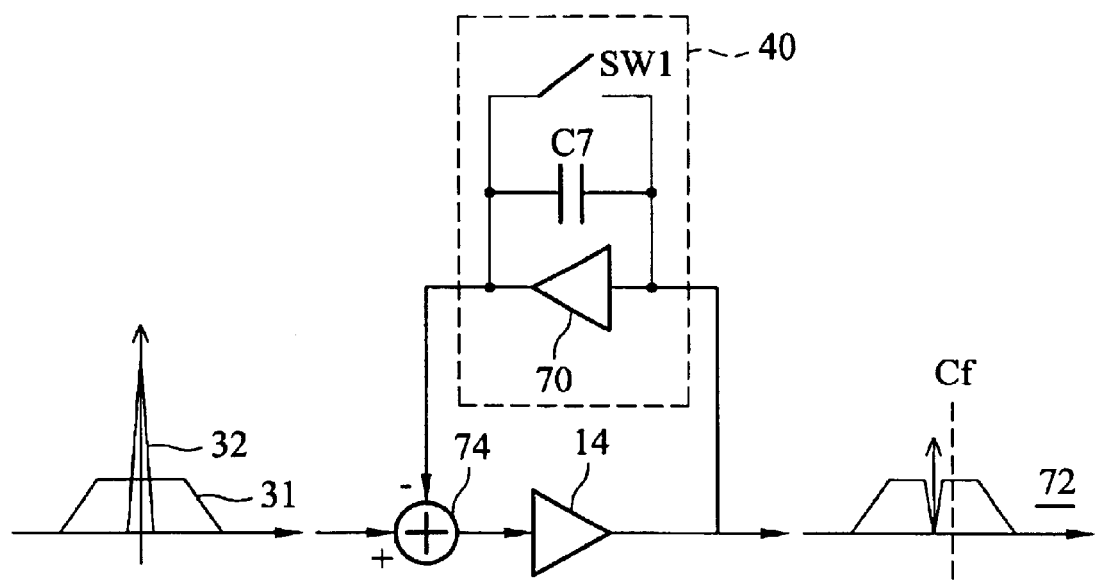
FIG. 7a shows the DC offset compensation circuit of the present invention with open switching circuit.
Figure 7B:
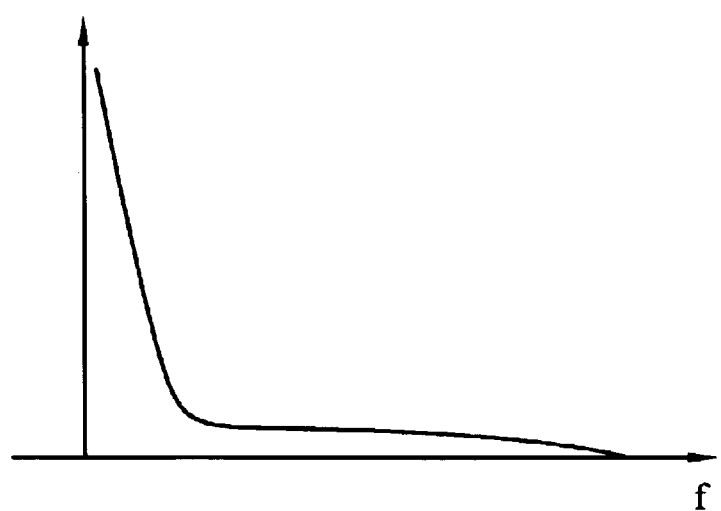

As shown in FIG. 7a, if the switching circuit is open, the bandwidth of the DC compensation circuit is confined (shown in FIG. 7b). Signal 32 passes through post-amplifier 14 and the compensation circuit generates a signal 72 similar to signal 31 with low cutoff frequency Cf. Under this circumstance, dynamic DC offset generated by the direct conversion receiver will be compensated.

Amplifier 70 in DC offset compensation circuit 40 connects to the post-amplifier 14 in a reverse direction. Amplifier 70 constructs a feedback circuit acting as a large capacitor, with capacitor C7 generating high pass response with low cutoff frequency. The circuit acts as a large Miller equivalent capacitor well suited to the high-gain direct conversion receiver described above to compensate the DC offset caused by amplifier.

Figure 7C:
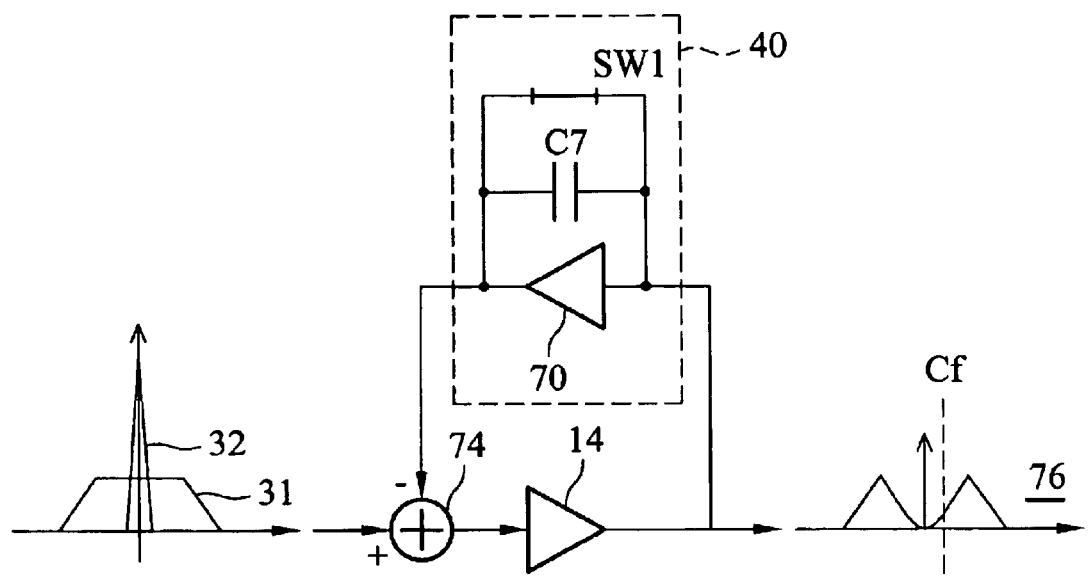
FIG. 7c shows the DC offset compensation circuit of the present invention with closed switching circuit.
Figure 7D:
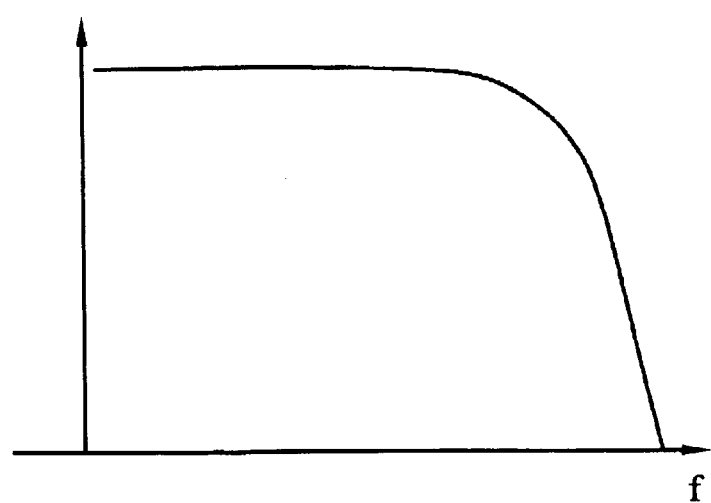
FIG. 7d shows the frequency response of the DC offset compensation circuit shown in FIG. 7c.

As shown in FIG. 7c, if the switching circuit is closed, the bandwidth of DC compensation circuit is broadened (shown in FIG. 7d) and the cutoff frequency Cf in the feedback circuit increased DC offset compensation thus speeds up, providing shorter compensation time. With the higher Cf, the received signal is either filtered out or severely distorted to allow function in system non-receiving status, such as transmission mode, warmup period, or other periods during which no signals are received. Most of the compensated DC offset in this condition is static DC offset.

In practice, more than one set of capacitor and resistor can be combined.

Figure 1:
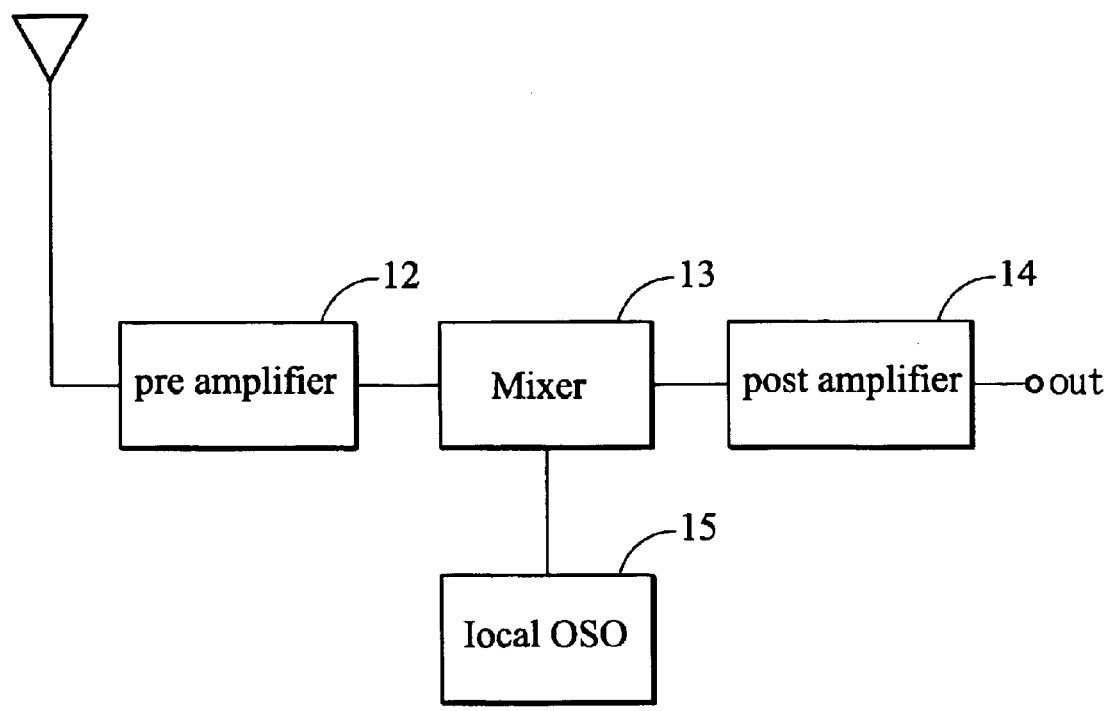
FIG. 1 is a block diagram of a conventional direct conversion receiver.
Figure 2:
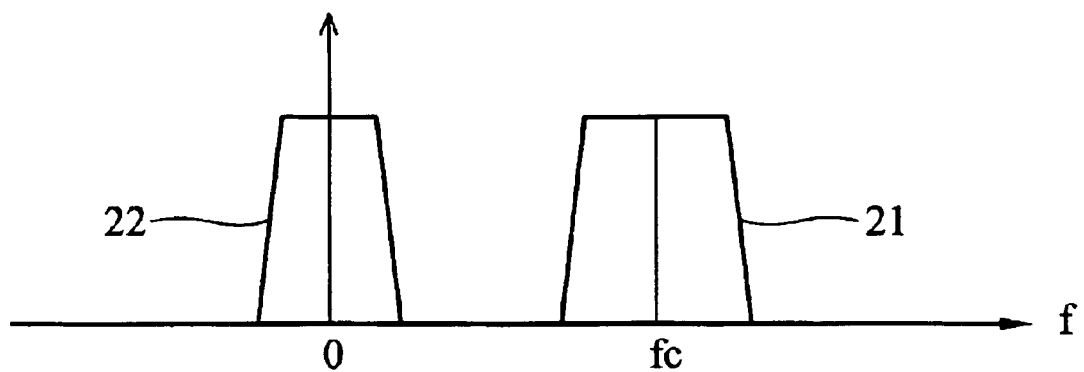
FIG. 2 is a chart showing ideal input-output frequency response.
Figure 3:
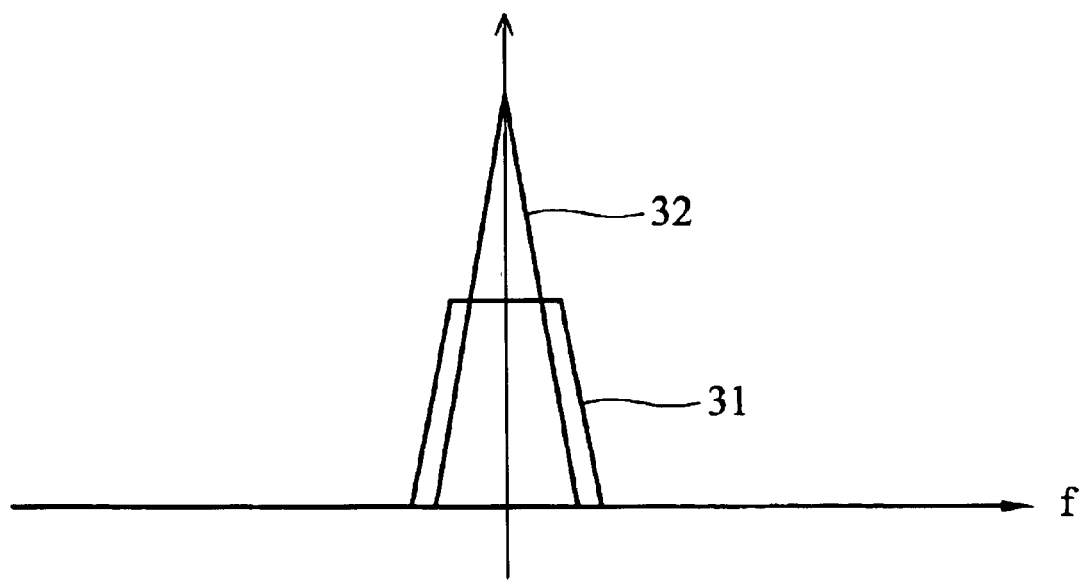
FIG. 3 is a chart showing functional input-output frequency response.
Figure 4:
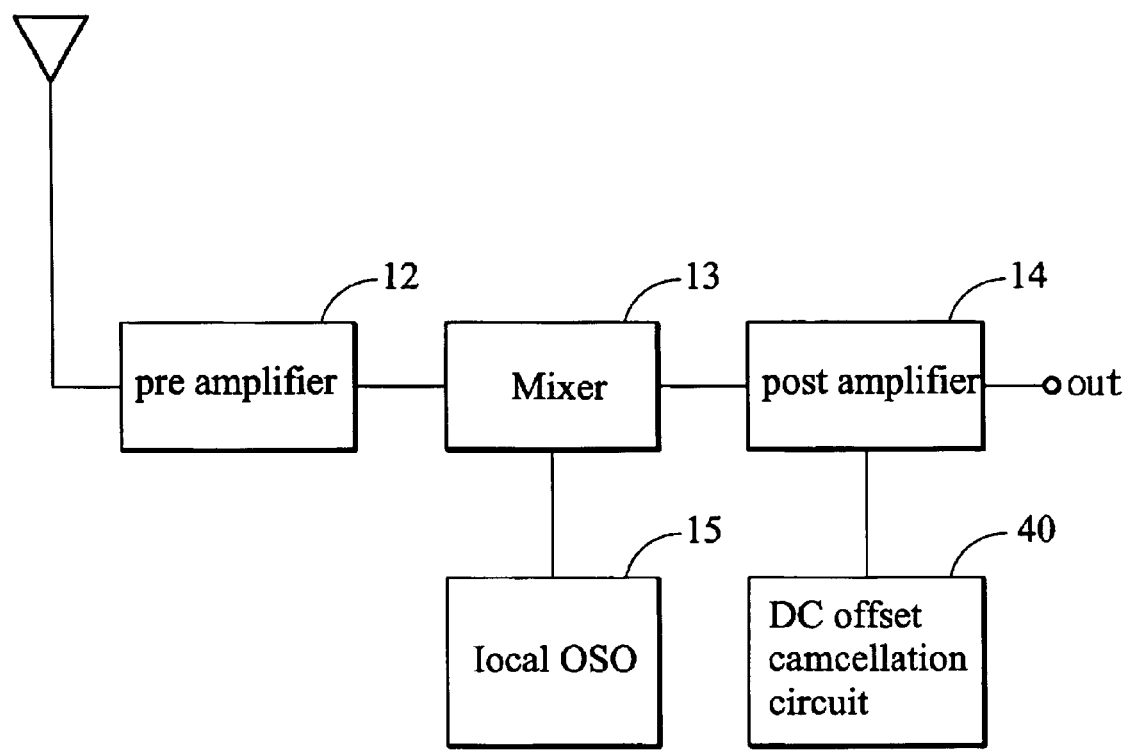
FIG. 4 is another block diagram of a conventional direct conversion receiver.
Figure 8:
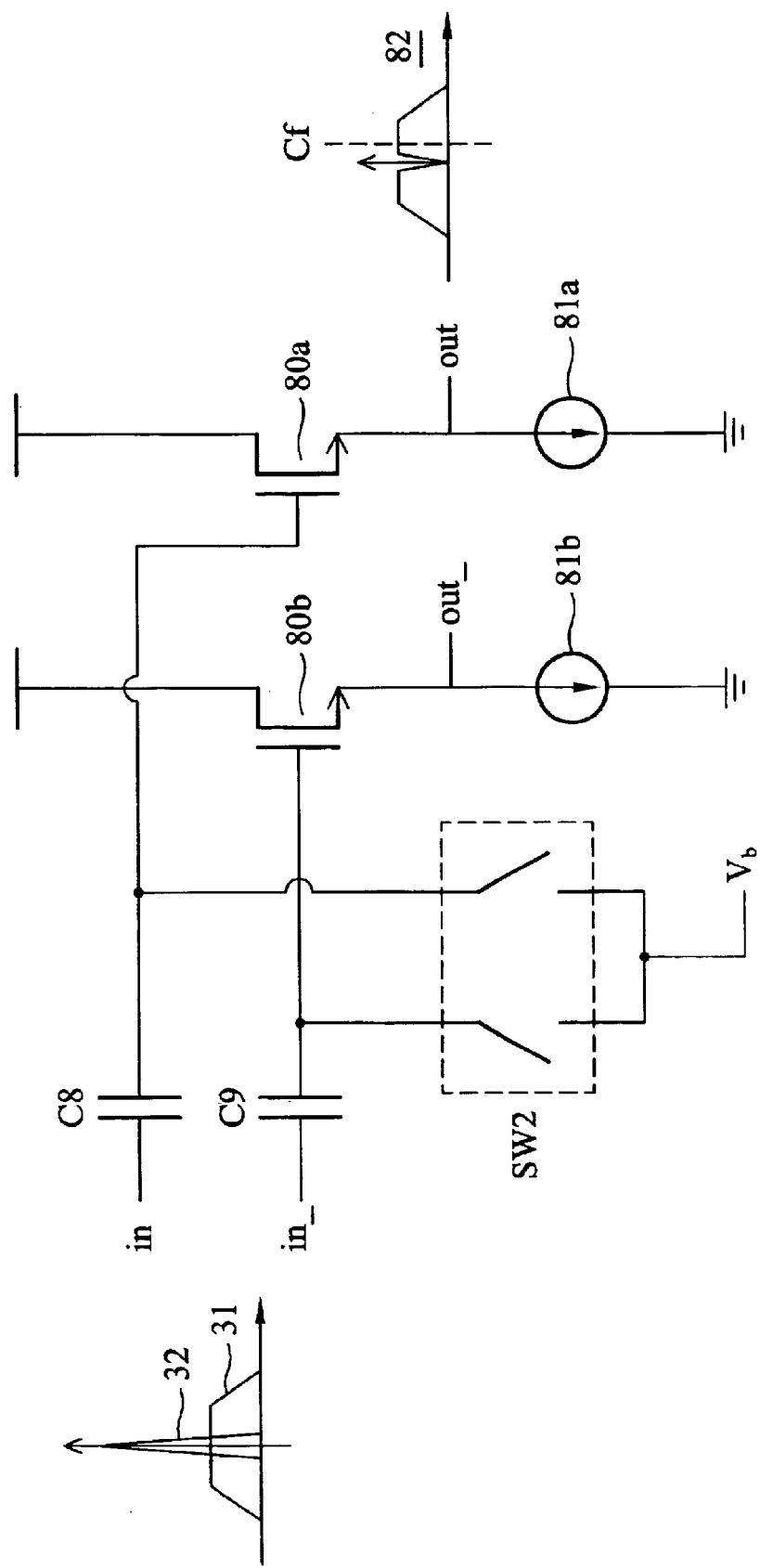
FIG. 8 shows another structure of the present invention.

In FIGS. 4 and 8, a second structure comprises two capacitors C8 and C9 connected to active devices 80a and 80b respectively, for example, to a MOS FET or the base terminal of a transistor. The transistor output signal 82 with DC offset is filtered out, similar to signals 31 and with cutoff frequency Cf from output terminals out and out_.

Additionally, gate external voltage of active devices 80a and 80b supplies voltage required by active devices 80 and 80b in static DC offset compensation mode. Source terminals of active devices 80a and 80b connect to a grounded current source to construct a voltage follower as a buffer for the next stage circuit.

If the switching circuit W2 is closed, external voltage directly supplies the bias voltage for base terminals of active devices 80a and 80b. Additionally, static DC offset generated by direct conversion receiver feeds into input port (in, in_). Both input ports (in, in_) carry respective DC voltage, responding directly to capacitors C8, C9. Since other terminals of capacitors are coupled, the static. DC offset generated by the voltage difference between capacitors (C8, C9) is stored in the capacitors CB and C9. If the switching circuit SW2 is open, the voltage contained in C8,C9 will compensate the static DC offset, normalizing the base terminal voltages of active devices 80a and 80b. The high impedance of the base terminal provides the base terminal with a low cutoff frequency high pass response, raising resistance. This circuit, well suited to the high-gain direct conversion receiver, not only compensates the DC offset generated by the amplifier but also eliminates the asymmetric error caused by circuit layout and manufacturing process, such that no baseband signal process mechanism is required.

Figure 9A:
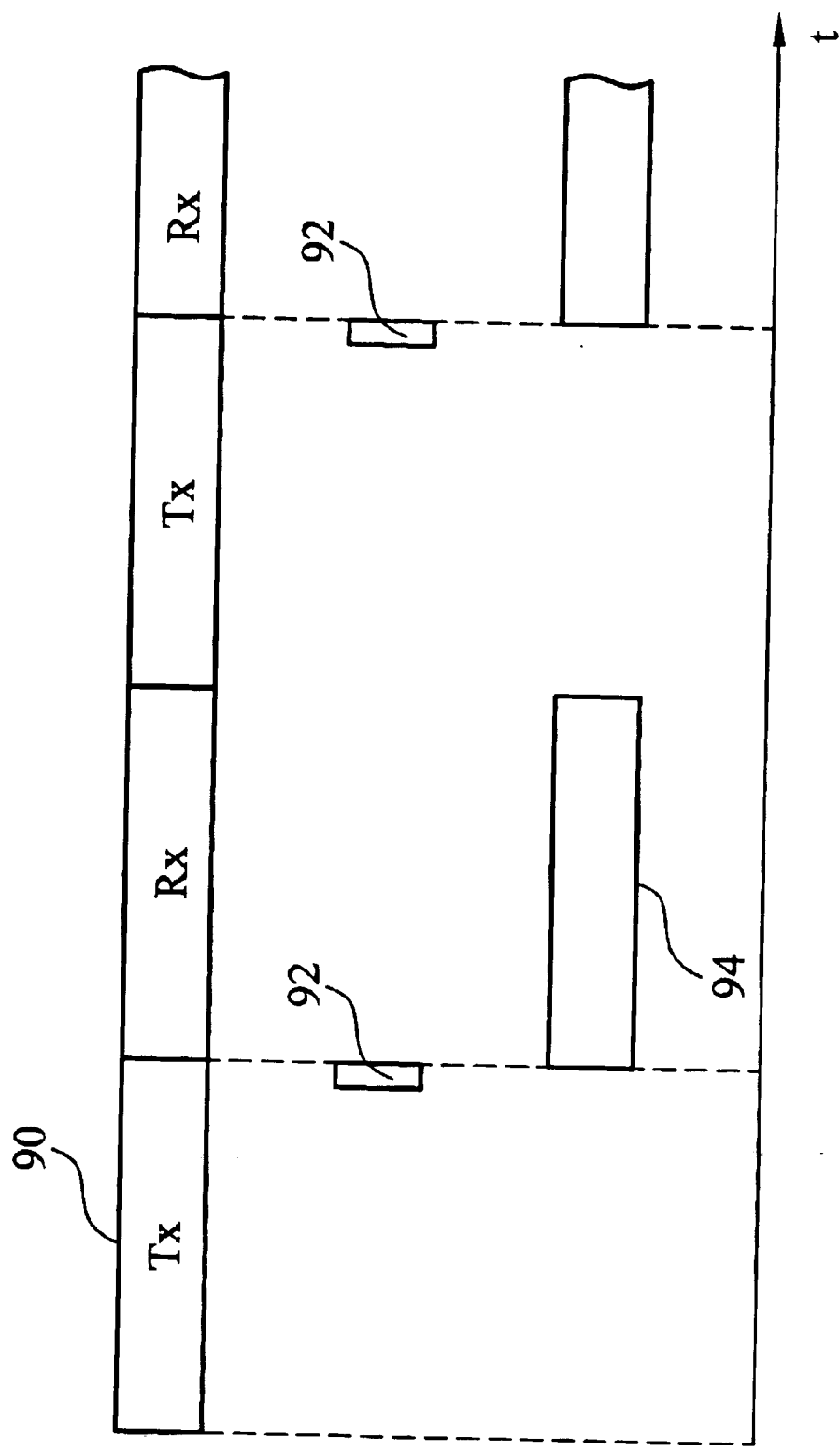
FIG. 9a is a chronological chart showing a TDMA communication system using the present invention.

FIG. 9a shows a Time Division Multiple Access (TDMA) communication system with transceivers including DC offset compensation circuit of the present invention. As shown in FIG. 9a, the horizontal axis shows time, with Tx of 90 showing the transmission period of the communication system. Rx of 90 shows the receiving period. 92 shows the period of the DC offset compensation circuit compensating the static DC offset in the transceiver, and 94 the period of the DC offset compensation circuit compensating the dynamic DC offset in the transceiver.

Figure 9B:
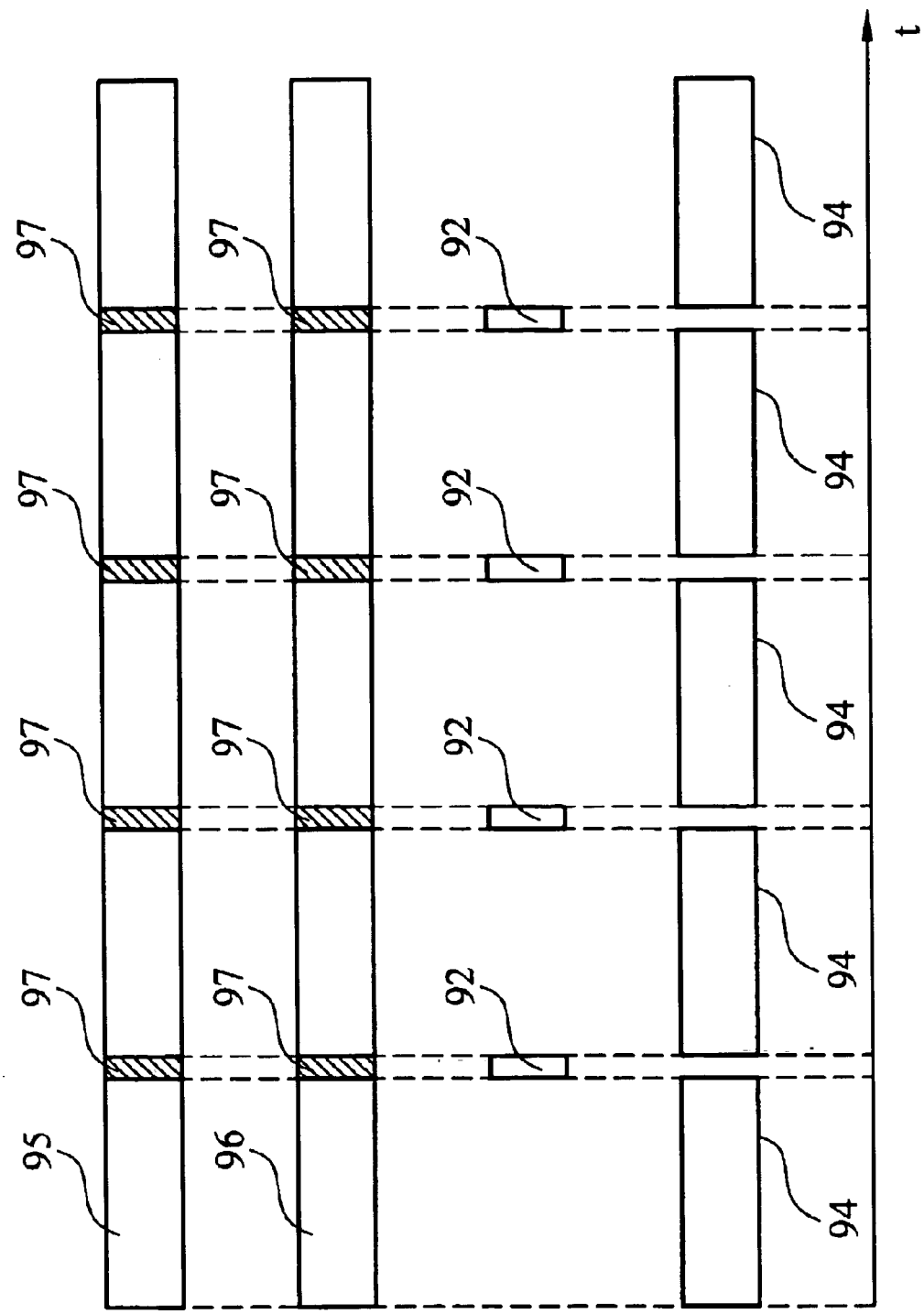
FIG. 9b is a chronological chart showing a CDMA or FDMA communication system using the present invention.

FIG. 9b shows a Frequency Division Multiple Access, (FDMA) or Code Division Multiple Access, (CDMA) communication system with transceivers including DC offset compensation circuit of the present invention. 95 shows the transmission period of the communication system, 96 shows the receiving working period, 97 the frame detection period (or guard period, 92 the period of the DC offset compensation circuit compensating the static DC offset in the transceiver, and 94 the period of DC offset compensation circuit compensating the dynamic DC offset in the transceiver and receive signal in the same time.

Figure 10:
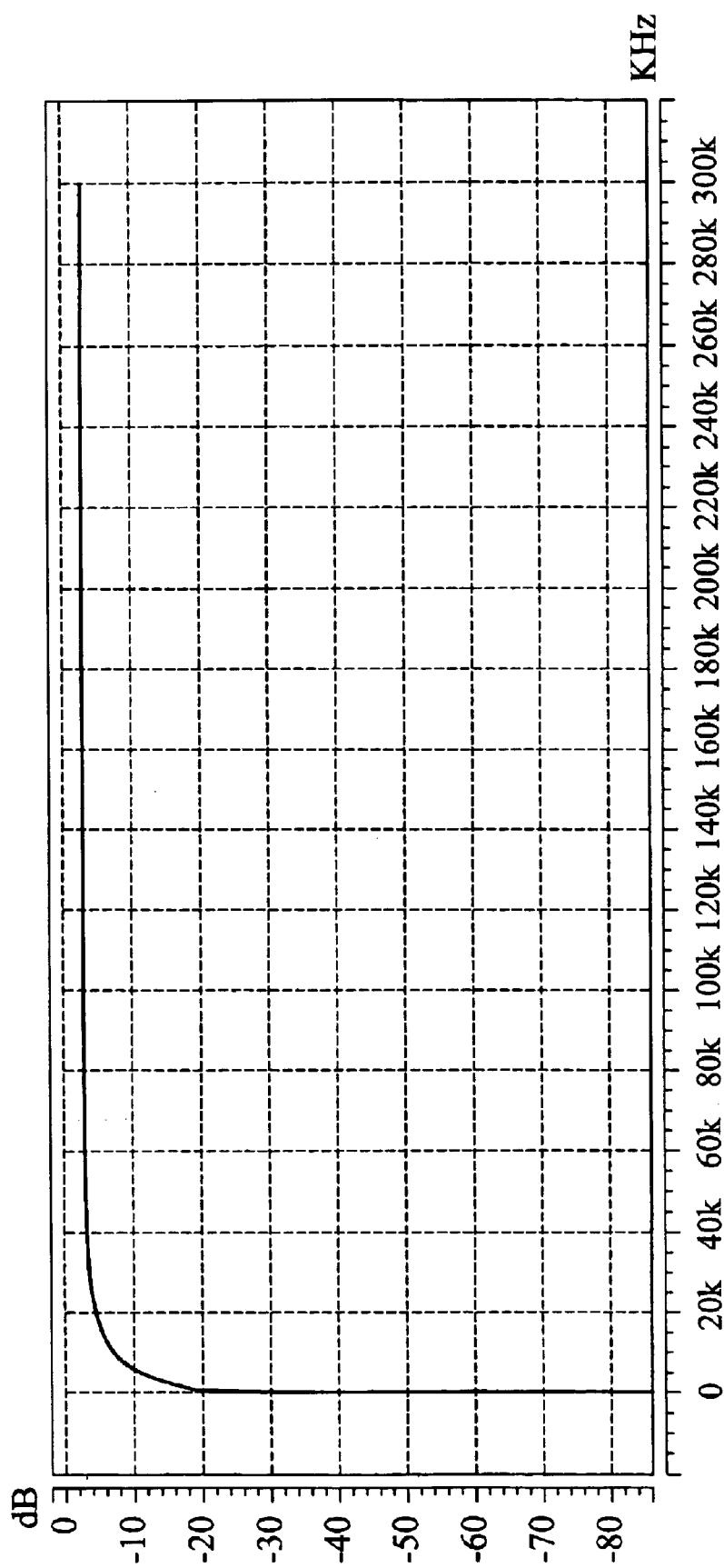
FIG. 10 shows the frequency response from a simulation of the present invention.
Figure 11:
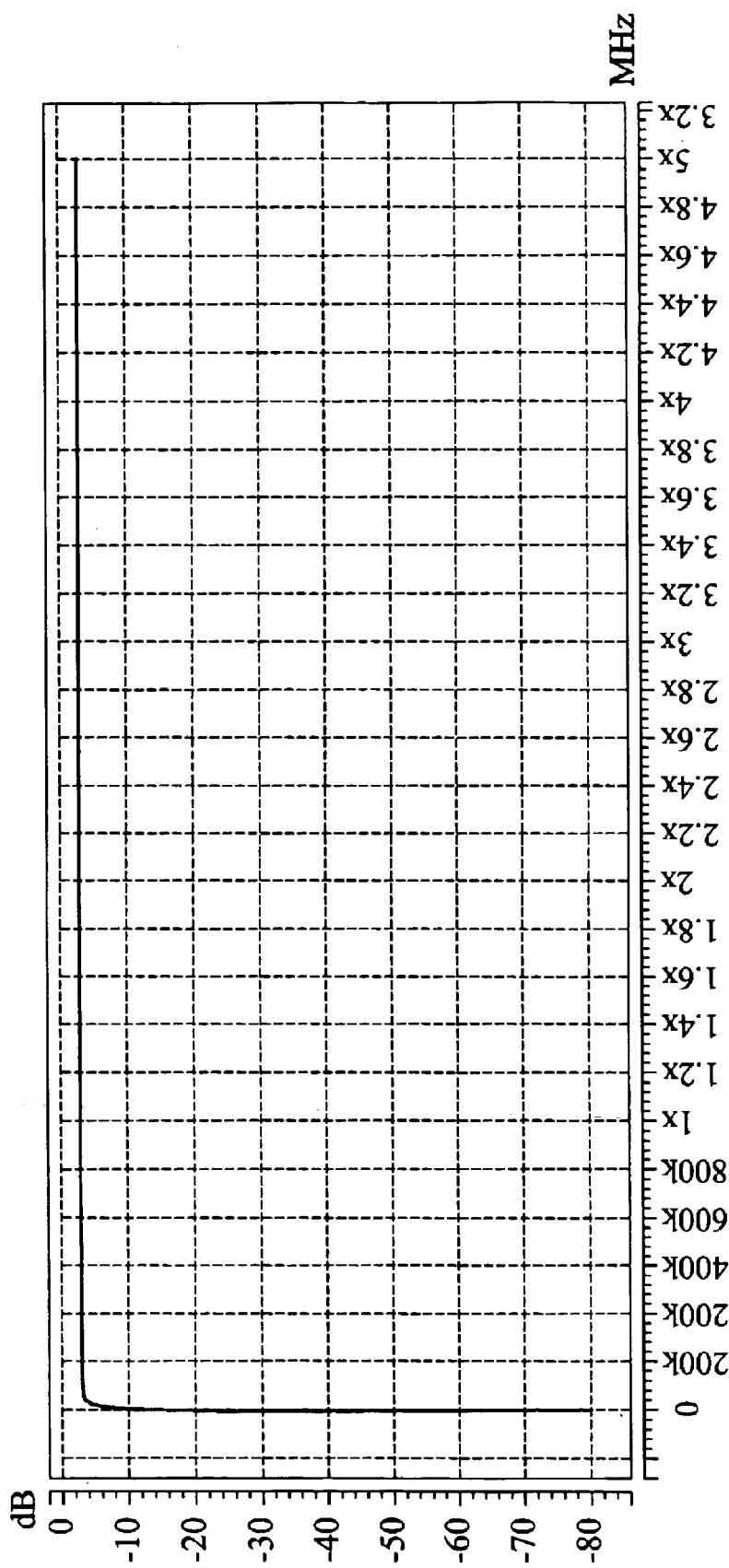
FIG. 11 shows another frequency response from a simulation of the present invention

A sample circuit was prepared with cutoff frequency of 5 KHz;DC rejection of >20 db; and Capacitance of 5 pF, with sample results generated shown in FIGS. 10 and 11. Comparing the frequency response range of 0–300 Khz in FIG. 10 and the frequency response 0–5 Mhz in FIG. 11, both frequency response curves are flat. The capacitance 5 pF in the sample provides a circuit uncomplicated enough to allow easy integration into a single chip, with no requirement for extra devices, allowing smaller die dimensions and lower cost DC offset compensation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC offset compensation circuit for a direct conversion receiver comprising a high-gain amplifier with an input terminal and an output terminal, with the output terminal of the amplifier connected to the input terminal of the direct conversion receiver, the circuit further comprising:

a capacitor;

an amplifier, comprising an input terminal and an output terminal, the input terminal of the amplifier connected to a one terminal of the capacitor and the output terminal of the direct conversion receiver, and the output terminal of the amplifier connected to the other terminal of the capacitor and the input terminal of the direct conversion receiver; and a switching circuit, connected in parallel to the capacitor and the amplifier; wherein, when the switching circuit is open, the capacitor and the amplifier comprise a combination circuit acting as a feedback circuit across the high-gain amplifier and generates a low cutoff frequency response to compensate a dynamic DC offset from the output terminal of the direct conversion receiver; and when the switching circuit is closed, a high cutoff frequency response compensates the static DC offset from the output terminal of the direct conversion receiver.

2. The DC offset compensation circuit as claimed in claim 1, further comprising a plurality of combination circuits, each comprising a capacitor and an amplifier, and connects to the switching circuit in parallel and cross-connects to the high-gain amplifier.

3. The DC offset compensation circuit as claimed in claim 1, wherein if the direct conversion receiver is not in a receiving mode, the switching circuit is closed.

4. A DC offset compensation circuit for a direct conversion receiver comprising a high-gain amplifier, further comprising:

a pair of capacitors;

a pair of active devices; and a pair of switching circuits, each separately connecting a capacitor and an active device, wherein, when the switching circuit is closed, the active devices store the DC offset in the capacitors; and when the switching circuit is open, the capacitors compensate the active device with the voltage stored, and the active device generates a low cutoff frequency response to compensate the dynamic DC offset generated by the direct conversion receiver.

5. The DC offset compensation circuit as claimed in claim 4, wherein each active device is a MOS device, comprising a base terminal connected to a capacitor of the pair of capacitor gate terminal connected to an external voltage source and a source terminal connected to a grounded current source.

6. The DC offset compensation circuit as claimed in claim 4, wherein the MOS device is a bipolar junction transistor (BJT).

7. The DC offset compensation circuit as claimed in claim 4, wherein if the direct conversion receiver is not in a receiving mode, the switching circuit is closed.

* * * * *